United States Patent [19]

Resz et al.

[11] 3,911,193

[45] Oct. 7, 1975

[54] COATED GRANULATES OF ETHYLENE/VINYL ACETATE COPOLYMERS

[75] Inventors: Raoul Resz, Bensberg-Refrath; Herbert Bartl, Odenthal-Hahnenberg; Gerhard Hohmann, Leverkusen, all of Germany

[73] Assignee: Bayer Aktiengesellschaft, Germany

[22] Filed: Apr. 4, 1974

[21] Appl. No.: 457,897

.Related U.S. Application Data

[63] Continuation of Ser. No. 292,444, Sept. 26, 1972, abandoned.

[30] Foreign Application Priority Data

Sept. 28, 1971  Germany............................. 2148224

[52] U.S. Cl. ................ 428/407; 427/222; 428/520
[51] Int. Cl.² .................... B32B 27/08; B32B 27/30
[58] Field of Search........ 117/100 A, 100 C, 132 C, 117/138.8 UA; 428/407, 520

[56] References Cited

UNITED STATES PATENTS

| | | | |
|---|---|---|---|
| 2,639,808 | 5/1953 | Barry et al. ............... | 117/138.8 UA |
| 3,254,044 | 5/1966 | Gunderman et al. ........ | 117/100 C X |
| 3,494,784 | 2/1970 | Coene et al. ................... | 117/100 C |
| 3,674,704 | 7/1972 | Bayless et al. .............. | 117/100 A X |
| 3,779,785 | 12/1973 | Stiles et al................... | 117/100 C X |

FOREIGN PATENTS OR APPLICATIONS 1,094,845   12/1967   United Kingdom

Primary Examiner—William D. Martin
Assistant Examiner—Stuart D. Frenkel
Attorney, Agent, or Firm—Connolly and Hutz

[57] ABSTRACT

Granulates of a copolymer of ethylene and vinyl acetate in a molar ratio of ethylene to vinyl acetate of from 10:1 to 1:2 coated with an aqueous dispersion of a polymer based on at least one methacrylic acid ester and, optionally, at least one ethyleneically unsaturated compound and process of producing the same.

4 Claims, No Drawings

COATED GRANULATES OF ETHYLENE/VINYL ACETATE COPOLYMERS

This application is a continuation of application Ser. No. 292,444, filed Sept. 26, 1972, now abandoned.

BACKGROUND OF THE INVENTION

This invention relates to a process for preventing granulates of ethylene/vinyl acetate copolymers containing ethylene and vinyl acetate in molar ratios of from 1 : 2 to 10 : 1, from sticking to one another by subjecting the granulate to a surface treatment. Up to 50% of the acetyl groups present in these copolymers may optionally be hydrolysed.

Ethylene/vinyl acetate copolymers with the aforementioned composition have numerous applications, for example as adhesives, as plasticisers for polyvinyl chloride and in the production of rubber-like vulcanisates. In order to enable these granulates to be conveniently handled, they have to be packed, transported, stored and used for the particular application envisaged in free-flowing form. However, it is known that granulated ethylene/vinyl acetate copolymers of the kind in which ethylene and vinyl acetate are present in molar ratios in the range of from 1 : 2 to 5 : 1, stick together after only brief storage at room temperature, and thereafter it is either extremely difficult or totally impossible to separate the individual granulate particles. Copolymers that are poorer in copolymerised vinyl acetate, i.e. copolymers containing ethylene and vinyl acetate in molar ratios of from 5 : 1 to 10 : 1, also show a tendency to stick together during transportation and storage in relatively high stacks, especially at temperatures of from 30° to 50°C. The tendency of ethylene/vinyl acetate copolymers to stick increases both with increasing content of copolymerised vinyl acetate, and also with increasing melt index and decreasing molecular weight.

Considerable difficulties are involved not only in the storage but also in the production of granulates of ethylene/vinyl acetate copolymers from the melt in which the copolymers generally accumulate after production. The warm particles obtained after cutting the melt while it is still hot under water show an even greater tendency to stick than the cold particles. Accordingly, a separating agent, for example talcum, has to be added to the water. The talcum is finely dispersed in the water and remains behind on the surface of the granulate after drying and, in this way, makes it difficult or impossible for the particles to stick to one another.

Numerous substances and combinations of substances for preventing granulates of ethylene/vinyl acetate copolymers from sticking together have already been proposed in British Patent Specification No. 1,094,845. However, the methods of treatment described in that Patent Specification do not give satisfactory results where crystal-clear transparency of the ethylene/vinyl acetate copolymer is required for the particular application envisaged.

One example of such an application is the coating of crystal-clear plastics films with contact adhesives based on ethylene/vinyl acetate copolymers of the kind used as contact-adhesive tapes. For application as an adhesive for crystal-clear films, the ethylene/vinyl acetate copolymer is employed in the form of solutions. In this connection, it is best to use combinations of solvents which consist to the greatest possible extent of light petrol, an inexpensive and low-toxicity solvent. It is not possible to use light petrol on its own because it is not able to dissolve the ethylene/vinyl acetate copolymers.

In order to obtain solutions of ethylene/vinyl acetate copolymers which are clear at room temperature, other solvents such as aromatic hydrocarbons, aliphatic or aromatic chlorinated hydrocarbons, carboxylic acid esters, ketones or ethers, are added to the light petrol. Since, in many cases, these solvents have an unpleasant odour and, for the most part, are physiologically much less acceptable and also more expensive that light petrol, it is important to manage with the smallest possible quantities of these added solvents. Accordingly, a separating agent which is to be used for coating an ethylene/vinyl acetate copolymer suitable for use as an adhesive for crystal-clear films, must be readily soluble in the aforementioned solvent mixtures. Unfortunately, this is not the case with most of the substances or combinations of substances that have hitherto been proposed for this purpose.

Another important requirement which the separating agents have to satisfy is not only that they should form a clear solution in the aforementioned solvent mixtures, but also that they should be highly compatible with the coated ethylene/vinyl acetate copolymers, in other words that they should form optically clear films following evaporation of the solvent. Since the copolymer granulates are coated under water acting as coolant and dispersion medium, the coating material used should be able either to be directly produced in finely disperse form or to be readily converted into such a form. The finer the dispersion of the separating agent in the water, the smaller the quantity of the agent required for adequately coating the granulate. In the case of a number of materials of which some have already been proposed for this purpose and which satisfy the two aforementioned requirements in regard to solubility and compatibility, the production of finely divided dispersions is either impossible or involves very considerable outlay and the presence of large quantities of emulsifiers.

Furthermore, the separating agents used for the purpose in question must not only be able to prevent the granulates from sticking together during and after wet granulation, they must also be able to prevent the granulates from sticking after they have been dried during prolonged storage, in some cases at temperatures of up to about 50°C. Accordingly, substances which during storage penetrate through diffusion into the ethylene/vinyl acetate copolymer and, thus, are removed from the surface of the granulate, are not suitable for use as separating agents. Examples of these unsuitable separating agents include all the low molecular weight products which are compatible with ethylene/vinyl acetate copolymers.

As can be seen from the foregoing considerations, a substance intended for coating granulates of ethylene/vinyl acetate copolymers has to satisfy various requirements. More particularly granulates of ethylene/vinyl acetate copolymers produced by such a process could be usesd for the production of optically clear films, in some cases following their partial hydrolysis or grafting with vinyl chloride.

The object of this invention was to develop a coating material for ethylene/vinyl acetate copolymers optionally partially hydrolysed which material not only prevents the copolymers from sticking together, but also shown outstanding solubility and compatibility.

According to the invention, this object was achieved by polymerising an ester of methacrylic acid optionally with one or more other copolymerisable, ethylenically unsaturated compounds and granulating the ethylene/vinyl acetate copolymers in an aqueous dispersion of the coating material.

DETAILED DESCRIPTION OF THE INVENTION

Accordingly, the invention relates to the use of an aqueous dispersion of a polymer or copolymer consisting of A. 70 to 100% by weight of one or more methacrylic acid esters corresponding to the general formula:

$$H_2C = C-COOR$$
$$\phantom{H_2C = }|$$
$$\phantom{H_2C = }CH_3$$

in which R represents an alkyl radical or cycloalkyl radical having from 1 to 10 carbon atoms, and B. 0 to 30% by weight of one or more ethylenically unsaturated compounds, copolymerisable with the methacrylic acid esters, corresponding to the general formula:

$$H_2C = CH - X$$

in which $X$ represents a phenyl radical optionally substituted by one or more alkyl groups having from 1 to 4 carbon atoms or by one or more halogen atoms, or a carbalkoxy radical corresponding to the general formula $$- COOR'$$

in which R' represents an alkyl or cycloalkyl radical having up to 12 carbon atoms, for preventing granulates of ethylene/vinyl acetate copolymers which contain ethylene and vinyl acetate in molar ratios of from 10 : 1 to 1 : 2 and in which up to 50% of the acetyl groups are optionally hydrolysed to hydroxyl groups, from sticking together.

It is preferred to use polymers or copolymers consisting of methacrylic acid methyl ester, ethyl ester, isopropyl ester, isobutyl ester, sec butyl ester, cyclohexyl ester, n-octyl ester, 2-ethylhexyl ester, decyl ester, and copolymers of the above compounds with o-, m-, p-methyl styrene, t-butyl styrene, sec-butyl styrene, p-isobutyl styrene, o-, m-, p-chlorostyrene, 2,3-, 2,4-, 2,5-, 2,6-, 3,4-, 3,5-dichlorostyrene, 2,4,4-trichlorostyrene, 2,3,4,5-tetrachlorostyrene and pentachlorostyrene, acrylic acid methyl ester, ethyl ester, isopropyl ester, sec.-butyl ester, cyclohexyl ester, n-octyl ester, 2-ethylhexyl ester, decyl ester and dodecyl ester.

The dispersions of the claimed polymers and copolymers are eminently suitable for coating ethylene/vinyl acetate copolymers with the aforementioned composition because, in the quantities in which they are used, amounting to between 0.1 and about 3% by weight, based on the coated granulate, they show excellent optical compatibility with the material to be coated. In the context of the invention, outstanding optical compatibility is the ability of the coating material to give crystal-clear films with the ethylene/vinyl acetate copolymer. By virtue of their high molecular weight, the coating materials according to the invention do not have any tendency to diffuse into the granulate particles during storage as a result of which they would be deprived of their effectiveness as separating agents.

The polymers and copolymers which are used to coat ethylene/vinyl acetate copolymers have the advantage that their finely divided dispersions can be obtained either by direct emulsion polymerisation, or from latices of this kind by precipating the polymer in an extremely finely divided form by conventional methods.

By varying the concentration of the polymer in the dispersion, the quantity of coating material applied to the granulate can be varied within wide limits. The dispersions are generally used with a polymer content of from 1 to 10% by weight although concentrated dispersions, optionally with a solids content of up to about 40% by weight are used in order to coat extremely tacky granulates with a tendency towards cold flow. In this case, the quantity of coating material fluctuates between 0.1 and 5% by weight of the coated granulate.

The finely divided hydrophobic coating material is more effectively absorbed on to the similarly hydrophobic surface of the ethylene/vinyl acetate copolymer granulates from the dispersions obtained by coagulating latices than from an emulsion. For this reason, the polymer latices are generally used with a solids concentration of at least 5% by weight, whereas, in the case of the coagulated latices, the preferred polymer concentration is from 1 to 5% by weight. The material to be granulated is either granulated while it is still hot immediately behind the extrusion die where it is sprayed with the dispersion, or alternatively the extruded strands are initially cooled in water or in the dispersion itself and then cut in the dispersion. The coated granulate is then separated from the excess dispersion on a sieve and dried by blowing with air optionally predried and heated.

The choice of the suitable finely dispersed polymers or copolymers is adapted to the particular requirements of the applications envisaged. Their choice is governed by the solubility and hence by the composition of the material to be coated. Polymers rich in copolymerised vinyl acetate are preferably treated with dispersions of polymethacrylic acid esters of alcohols having from 1 to 4 carbon atoms, whilst copolymers poorer in copolymersed vinyl acetate are preferably treated with dispersions of polymethacrylic acid esters of higher alcohols, for example, propyl, butyl, amyl or cyclohexyl alcohol, as separating agents. The polymethacrylic acid esters are only soluble in solvents with a high content of low-boiling paraffin hydrocarbons upwards of an alcohol component with more than 4 carbon atoms. In the case of the ethylene/vinyl acetate copolymers with a high vinyl acetate content, the polymethacrylic acid esters used are dissolved by an increased addition of other solvents such as aromatic hydrocarbons, aliphatic or aromatic chlorinated hydrocarbons, carboxylic acid esters, ketones or ethers. Coating materials with more than 4 carbon atoms in the alcohol component are preferably used in the form of finely divided dispersions for the granulation of ethylene-rich ethylene/vinyl acetate copolymers, i.e. copolymers containing ethylene and vinyl acetate in molar ratios of from 3 : 1 to 10 : 1.

Polymethacrylic acid esters having softening points, characterised, for example, by the Vicat softening temperature or by the glass transition temperature, are above about 50°C, are preferably used for the purposes of the invention. Polymethacrylic acid esters with softening points below 50°C are best used in the form of copolymers with other methacrylic acid esters whose polymers have high softening points rather than in the form of homopolymers, with the object of improving the solubility of the coating material in solvent mixtures with a high paraffin hydrocarbon content. When used in the form of finely divided dispersions, polymers with softening points below 50°C show a tendency when dried to form coherent, film-like coatings on a substrate rather than powder-form coverings. The disadvantage of this behaviour is that, on the one hand, the granulate is made tacky by the coating material when dried, whilst on the other hand other objects which come into contact with the dispersion during coating of the granulate are provided during drying with a film-like, solid coating. This particular phenomenon can lead to considerable difficulties in the application of the process, for example in the rapid blockage of sieves, etc. The glass temperatures (glass-transition temperatures) and the Vicat softening temperatures of various polymethacrylic acid esters are shown in the following Table.

Table 1

| Polymethacrylic acid ester | Glass transition temperature (°C) | Vicat softening temperature |
|---|---|---|
| methyl- | 105 | 119 |
| ethyl- | 65 | 81 |
| n-propyl- | 35 | 55 |
| isopropyl- | 81 | 88 |
| n-butyl- | 20 | 30 |
| isobutyl- | 53 | 67 |
| sec.-butyl- | 45 | 60 |
| tert.-butyl- | — | 104 |
| n-amyl- | −5 | 20 |
| isoamyl- | — | 46 |
| neopentyl- | — | 115 |
| n-octyl- | −20 | — |
| 2-ethylhexyl- | −10 | — |
| n-decyl- | −70 | — |
| n-dodecyl- | −65 | — |
| cyclohexyl- | 56 | — |

The glass-transition temperatures quoted in Table 1 are taken from the publications of D. E. Strain, R. G. Kennelly and H. R. Dittmar, Ind. Eng. Chem. 31, 382 (1939) and W. A. Lee and G. J. Knight, Polymer Handbook, Interscience Publishers III 61 (1966) whilst the Vicat softening temperatures are taken from the publication of C. E. Rehberg and C. H. Fischer, Ind. Eng. Chem. 40, 1429 (1948).

By virtue of their high softening points, the dispersions of the polymers of methyl, ethyl, isopropyl, isobutyl sec.-butyl and cyclohexyl esters of methacrylic acid, are particularly suitable for the purposes of the invention.

Providing they show little or no cold flow, the granulates coated by the process according to the invention can be stored for prolonged periods at temperatures below 50°C. in layers of up to about 50 cm without sticking. Soft polymer granulates with a tendency towards cold flow usually undergo a contraction in volume of the loose material during storage, although in the presence of a sufficient quantity of coating agent they do not undergo fusion into a block. The contracted mass can be broken up again into pieces with the size of the granulate particles under a slight mechanical effect.

EXAMPLES 1 to 15

A solution of 1.2 g of sodium lauryl sulphate (Texapon K 12 Trade Mark) and 3 g of perhydrol (30% aqueous hydrogen peroxide solution) in 450 g of water is introduced into a 3-litre-capacity glass mixer vessel, the air present in the vessel displaced by nitrogen and 120 g of the monomer or monomer mixture specified in Table 2 introduced together with 0.6 g of tert.-dodecyl mercaptan as regulator.

The mixture is heated with moderate stirring to a temperature of 80°C and is maintained at this temperature for 1 hour. Thereafter, a solution of 2.4 g of tert.-dodecyl mercaptan in 480 g of the above monomer or monomer mixture and a solution of 4.8 g of sodium lauryl sulphate and 3 g of perhydrol in 450 g of water are simultaneously introduced at a constant rate over a period of 6 hours. After the solutions have been added, the latex formed is heated for 6 hours to 80°C and then cooled while stirring to below 30°C.

Under the aforementioned conditions, a polymerisation conversion in excess of 98% is obtained, so that there is no need for the residual monomer to be removed. One part of the latices with a solids content of about 40% by weight is diluted with 7 parts of water to a concentration of around 5% by weight of dispersed polymer, followed by the introduction into these latices of fragments of pure ethylene-vinyl acetate copolymer containing ethylene and vinyl acetate in a molar ratio Table 2

| Example No. | 1st monomer type | quantity (%) | 2nd monomer type | quantity (%) |
|---|---|---|---|---|
| 1 | isobutyl methacrylate | 100 | — | — |
| 2 | methylmethacrylate | 100 | — | — |
| 3 | n-butyl methacrylate | 100 | — | — |
| 4 | isobutyl methacrylate | 75 | styrene | 25 |
| 5 | n-butyl methacrylate | 80 | styrene | 20 |
| 6 | sec.-butylmethacrylate | 100 | — | |
| 7 | isobutyl methacrylate | 90 | methylmethacrylate | 10 |
| 8 | isobutyl methacrylate | 50 | methylmethacrylate | 50 |
| 9 | cyclohexyl methacrylate | 100 | — | |
| Comparison Example | | | | |
| 10 | — | — | — | — |
| 11 | styrene | 100 | — | — |
| 12 | isobutyl methacrylate | 50 | styrene | 50 |
| 13 | n-butylmethacrylate | 50 | styrene | 50 |
| 14 | p-isobutyl styrene | 100 | — | — |
| 15 | styrene | 50 | ethylhexylmethacrylate | 50 | of 3.8 : 1. The polymer fragments with diameters in the range of from about 5 to 10 mm are obtained by cutting a block of the solidified melt of the copolymer. The granulates treated for a few minutes with the latices are then poured on to a sieve and dried by blowing air through them accompanied by vibration.

The resulting granulates of the ethylene/vinyl acetate copolymer are coated with thin layers of the coating material which, with the exception of the granulate obtained in accordance with Example 3, are of a powdery quality. By contrast, the granulate coated with poly-n-butylmethacrylate shows a continuous, but non-tacky surface covered with a film of the coating material.

Some properties of the coated granulates are compared in Table 3:

1. The storability of the granulate at 25°C and at 50°C. A 500 cc-capacity measuring cylinder was filled with the granulate and stored for 24 hours at the temperature specified. The appearance of the granulates is assessed in accordance with the following classification:
   A = free flowing
   B = granulates stuck slightly together although still readily separable
   C = granulates stuck more heavily together, although separable
   D = granulates stuck heavily together, inseparable
2. Solubility in mixtures of light petrol and toluene
   The granulate was dissolved at 25°C in the solvents and solvent mixtures specified in Table 3 and the appearance of the solution compared with that of a solution of the untreated ethylene/vinyl acetate copolymer.
Classification:
   L = clear, transparent solution
   T = slightly hazy solution
   U = heavily clouded solution, coating material insoluble.
3. Compatibility
   The compatibility of the coating material with the ethylene/vinyl acetate copolymer was tested by casting an approximately 100 $\mu$ thick film onto a glass plate from a 25% by weight solution of the granulate in toluene, drying this film for 24 hours at room temperature and then for 6 hours at 60°C and comparing the appearance of the film with that of a film obtained from the untreated ethylene/vinyl acetate copolymer.

It is apparent from the Comparison on Tables 2 and 3 that those granulates of ethylene/vinyl acetate copolymers which were treated with polymer dispersions with the composition according to the invention as in Examples 1 to 9, were satisfactory in all three important service properties quoted, whereas the granulates produced in accordance with Comparison Examples 11 to 15, in which case coating materials with a composition outside the claimed limits, were used, show no evidence of optical compatibility with the ethylene/vinyl acetate copolymers. The granulates produced in accordance with Comparison Examples 11 to 15 all gave heavily clouded cast films.

EXAMPLE 16

56.2 kg of water in which 150 g of sodium lauryl sulphate (Texapon K 12 Trade Mark) and 450 g of 30% by weight hydrogen peroxide solution are dissolved, are introduced into a 250 litre-capacity V4A mixer vessel, and a mixture of 15 kg of isobutyl methacrylate and 75 g of tert.-dodecyl mercaptan is subsequently added. After the air present in the mixer vessel has been displaced by nitrogen, the contents of the vessel are heated to 80°C, after which a solution of 600 g of sodium lauryl sulphate and 450 g of 40% hydrogen peroxide solution in 56.2 kg of water and a solution of 300 g of tert.-dodecyl mercaptan in 60 kg of isobutyl methacrylate are pumped in from two separate supply vessels while stirring at a uniform rate over a period of 6 hours. After the solutions have been pumped in, the temperature of the vessel contents is kept at 80°C for another 6 hours, during which time polymerisation is completed. The latex obtained has a residual monomer content of 0.08% by weight and a solids content of 40.1% by weight. The residual monomer does not have to be removed for the application of the end product as a coating material. The latex prepared as described above is diluted with water to a solids content of 5% by weight and poured into a long tank arranged in front of an extruder. By means of a suitable take-off unit of conventional type, the extruded strand of an ethylene/vinyl acetate copolymer, containing ethylene and vinyl acetate in a molar ratio of 4.2 : 1, is drawn through the latex and, after cooling, cut into fragments about 5 to 10 mm in size by a high-speed blade beneath the sur- Table 3

| Example No. | Storability at 25°C | Storability at 50°C | Solubility in mixtures of toluene/light petrol 1:0 | 1:1 | 1:2 | 1:4 | 0:1 | Compatibility Appearance of a film cast from a solution of the granulate |
|---|---|---|---|---|---|---|---|---|
| 1 | A | B | L | L | L | L | U | clear |
| 2 | A | B | L | U | U | U | U | clear |
| 3 | A | C | L | L | L | L | U | almost clear |
| 4 | A | B | L | L | L | L | U | slightly hazy |
| 5 | A | B | L | L | L | L | U | slightly hazy |
| 6 | A | B | L | L | L | T | U | clear |
| 7 | A | B | L | L | L | L | U | clear |
| 8 | A | B | L | U | U | U | U | clear |
| 9 | A | B | L | L | L | L | U | clear |
| Comparison Example | | | | | | | | |
| 10 | D | D | L | L | L | L | U | clear |
| 11 | A | B | L | L | T | U | U | heavily clouded |
| 12 | A | B | L | L | L | T | U | clouded |
| 13 | A | B | L | L | T | U | U | clouded |
| 14 | A | B | L | L | L | T | U | heavily clouded |
| 15 | B | D | L | L | L | T | U | heavily clouded | face of the liquid. The moist granulate is collected on a sieve and dried by blowing air through accompanied by vibration. Under the test conditions, approximately 0.4% by weight of coating material remain adhering to the surface of the granulate. After storage for several months at 20° to 30°C in the form of a 25 kg package, the product is found to be still free-flowing. The granulate dissolves to form a clear solution in a mixture of 80% by weight of light petrol and 20% by weight of toluene and, cast from this solution, gives crystal clear films. The coating material does not affect the adhesion of the film to various substrates or its mechanical properties.

EXAMPLE 17

760 g of lauric acid and 220 g of potassium hydroxide are dissolved by heating to 50°C in 23.3 kg of pure water in a 100 litre-capacity mixer vessel and the air present in the vessel is displaced by nitrogen. At an internal temperature of 50°C, a mixture of 4 kg of isobutyl methacrylate and 20 g of tert.-dodecyl mercaptan is introduced followed by a solution of 50 g of potassium per sulphate and 63 g of sodium bicarbonate in 3.33 kg of water. The mixture is heated with moderate stirring for 1 hour to 50°C, after which a solution of 80 g of tert.-dodecycl mercaptan in 22.7 kg of isobutyl methacrylate and a solution of 50 g of potassium persulphate in 3.33 kg of water are simultaneously pumped in from two containers over a period of 4 hours. After the solutions have been pumped in, the latex is heated for 4 hours to 50°C and then for 8 hours to 60°C to complete polymerisation.

The 51 kg of latex with a solids content of 40.7% by weight are diluted with 100 kg of water in an approximately 300 litre-capacity mixer vessel, and a mixture of 3.9 litres of 1N hydrochloric acid and 46.1 litres of water are run in with thorough stirring over a period of 2 hours, resulting in the formation of a pasty composition which contains about 10% by weight of polyisobutyl methacrylate and in which the polymer is present in extremely fine distribution.

1 part of the homogenised paste obtained, containing 10% by weight of finely divided isobutyl methacrylate, is diluted with 9 parts of water, and the size reduction of a hot, molten ethylene/vinyl acetate copolymer issuing from an extruder, containing ethylene and vinyl acetate in a molar ratio of 1 : 3.8, carried out in the resulting 1% by weight suspension by means of a conventional cutting unit. The hydrophobic surface of the particles cut off is immediately covered under these conditions with a thin layer of the finely divided polymer which prevents it from sticking during cooling. The granulate particles present in the suspension are separated from the suspension by means of a sieve and dried by blowing dry air through.

The granulate obtained contains approximately 0.5% by weight of polyisobutyl methacrylate in very finely divided form on the surface. The properties of the granulate in regard to its storability, solubility and the optical properties of films cast from it correspond to those of the material described in Example 16.

EXAMPLES 18 to 20

A block, in the form of a solidified melt, of an ethylene/vinyl acetate copolymer containing ethylene and vinyl acetate in molar ratios of 2.2 : 1, is cut into fragments approximately 6 to 10 mm in diameter and treated with the latices already used and described in Examples 1 and 2 and in Comparison Example 11, diluted to the concentrations specified in Table 4, speared off and dried.

Table 4

| Example | Coating material: type of latex | concentration % | Storability at 25°C | 50°C | Solubility in Toluene | Compatibility: appearance of a film cast from a solution of the granulate in toluene | Quantity of the coating material in g based on 100 g of ethylene/vinyl acetate copolymer |
|---|---|---|---|---|---|---|---|
| 18 a) | polyiso-butylmethacrylate | 40 | A | A | L | almost clear | 3.30 |
| b) | | 20 | A | A | L | clear | 1.55 |
| c) | | 10 | B | B | L | clear | 0.65 |
| 19 a) | polymethyl methacrylate | 40 | A | A | T | slightly hazy | 2.80 |
| b) | | 20 | B | B | T | almost clear | 1.10 |
| c) | | 10 | B | C | K | clear | 0.50 |
| Comparison Example 20 a) | polystyrene | 40 | A | A | T | heavily clouded | 4.00 |
| b) | | 20 | A | A | T | clouded | 1.85 |
| c) | | 10 | B | B | T | clouded | 0.85 |

The properties of the coated ethylene/vinyl acetate copolymers were tested and assessed in the same way as in Examples 1 to 9. The test results are also set out in Table 4. The granulates produced in accordance with Examples 18 a–c and 19a–c show adequate compatibility of the ethylene/vinyl acetate copolymer with the coating material, whereas the granulate coated with polystyrene in accordance with Comparison Example 20, although adequately storable, does not give clearly transparent films.

EXAMPLE 21

A partially hydrolysed ethylene/vinyl acetate copolymer which, before hydrolysis, contained ethylene and vinyl acetate in a molar ratio of 3.8 : 1 and in which up to 12% of the acetyl groups are hydrolysed into hydroxyl groups, is introduced in 6 to 10 mm diameter fragments into the 1% by weight isobutyl methacrylate suspension used in Example 17, filtered off after brief stirring and the treated granulate was dried by blowing air through. The coated granulate dissolves to form a clear solution in toluene and, when cast onto a glass plate, the resulting solution gives clear, transparent films following removal of the toluene by drying. The coated granulate has a storability at 25° to 50°C corresponding to that of the granulate of unhydrolysed ethylene/vinyl acetate copolymer coated in accordance with Example 17.

What we claim is:

1. A treated granulate produced by the process comprising coating a copolymer of ethylene and vinyl acetate having an ethylene to vinyl acetate molar ratio of from 3:1 to 10:1 with an aqueous dispersion of a polymer consisting of polymerized (A) 70 to 100% by weight of at least one methacrylic acid ester of the formula

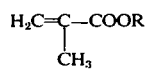

wherein R is propyl, butyl, amyl or cyclohexyl and (B) up to 30% by weight of at least one ethylenically unsaturated compound of the formula $$H_2C=CH-X$$

wherein $X$ is phenyl, halogen substituted phenyl, alkyl substituted phenyl wherein each alkyl moiety has from 1 to 4 carbon atoms or —COOR' wherein R' is alkyl or cycloalkyl having up to 12 carbon atoms.

2. The product produced by the process of claim 1 wherein up to 50% of the acetyl groups in said copolymer of ethylene and vinyl acetate are hydrolyzed to hydroxyl groups.

3. The product produced by the process of claim 1 wherein the polymer of said aqueous dispersion has a glass transition temperature above 50°C.

4. The product produced by the process of claim 1 wherein the polymer of said aqueous dispersion has a Vicat softening point above 50°C.

* * * * *